United States Patent [19]
Usui

[11] Patent Number: 5,473,391
[45] Date of Patent: Dec. 5, 1995

[54] CONVERGENCE DISPLACEMENT CORRECTING DEVICE FOR PROJECTION-TYPE IMAGE DISPLAY APPARATUS AND METHOD THEREOF

[75] Inventor: Masahiro Usui, Nagaokakyo, Japan

[73] Assignee: Mitsubishi Denki Kabushiki Kaisha, Tokyo, Japan

[21] Appl. No.: 233,527

[22] Filed: Apr. 26, 1994

[30] Foreign Application Priority Data

Jun. 11, 1993 [JP] Japan .................................. 5-140709

[51] Int. Cl.⁶ .................................................. H04N 3/23
[52] U.S. Cl. ......................... 348/746; 348/778; 348/806; 315/368.24
[58] Field of Search ................................. 348/744, 746, 348/747, 778, 806, 807; 358/60; 315/368.24, 368.18, 371; H04N 3/22, 3/23, 3/223, 9/31, 9/28

[56] References Cited

U.S. PATENT DOCUMENTS 4,961,030 10/1990 Ogino ....................................... 348/746
5,164,639 11/1992 Shimaoka ........................... 315/368.18

FOREIGN PATENT DOCUMENTS 61-277288 12/1986 Japan .

Primary Examiner—James J. Groody
Assistant Examiner—Sherrie Hsia

[57] ABSTRACT

A projection-type image display apparatus, in which a correction raster shape correction circuit is supplied with a sawtoothed-shaped voltage changing in level in accordance with a static convergence regulation voltage for correcting respective raster shapes displayed on the respective picture planes of a plurality of cathode-ray tubes, so that the convergence is not displaced at the peripheral portions of the picture screen at the time of regulating the static convergence.

8 Claims, 17 Drawing Sheets

ONE HORIZONTAL
SCANNING PERIOD

CONVERGENCE DISPLACEMENT CORRECTING DEVICE FOR PROJECTION-TYPE IMAGE DISPLAY APPARATUS AND METHOD THEREOF

BACKGROUND OF THE INVENTION

1. Field of the Invention

The present invention relates to a projection-type image display apparatus comprising a plurality of cathode-ray tubes for displaying different monochromatic images on the respective picture planes, and projecting the images on the screen.

2. Description of Related Art.

A schematic plan view of the optical system of a projection-type image display apparatus is shown in FIG. 1. In front of the screen 3 cathode-ray tubes (hereinafter referred to as "the CRTs") 11, 12, 13 are arranged in juxtaposition. The CRT 12 is located on one side of the central CRT 11 and the CRT 13 on the other side thereof. The picture planes (not shown) of the CRTs 11, 12, 13 are in opposed relation to the screen 3. The CRT 11 is adapted to illuminate in monochrome of green (G), the CRT 12 in monochrome of red (R), and the CRT 13 in monochrome of blue (B), so that a monochromatic image is displayed on the picture planes of the CRTs 11, 12, 13 respectively.

The projection-type image display apparatus of this type generally comprises a CRT for displaying a green (G) image arranged at the center, a CRT for displaying a red (R) image on one side, and a CRT for displaying a blue (B) image on the other side thereof. Projection lenses 21, 22, 23 are arranged in front of the CRTs 11, 12, 13, respectively. The optical axes of the projection lenses 22, 23 have a convergence angle 40 and are positioned inward of the screen 3.

Now, the operation of this projection-type image display apparatus will be described.

When images of green (G), red (R) and blue (B) are displayed separately on the respective picture planes of the CRTs 11, 12, 13, each image is projected on the screen 3 in the form enlarged by the projection lenses 21, 22, 23. A full-color image synthesized from the images of green (G), red (R) and blue (B) is thus displayed on the screen 3 as an image available for observation.

This projection-type image display apparatus has a convergence angle 40 between the optical axis 41 of green (G) (control CRT 11) and the optical axis 42 of red (R) (CRT 12), as shown in FIG. 1. As a result, when a rectangular raster of the same shape as the green (G) raster displayed on the picture plane of the CRT 11 is displayed on the picture plane of the CRT 12 for displaying a red (R) image, the image projected on the screen 3, as shown in FIG. 2, is such that the green (G) raster 51 is rectangular while the red (R) raster 52 is distorted to a trapezoid as shown by dashed line. FIG. 2 shows a shape of the red raster 52 projected on the screen as viewed from the user. Also, the blue (B) raster is distorted in a laterally inverted shape as compared with the red (R) raster 52. This is attributable to the presence of the convergence angle 40 which results in different magnifications of the images projected on the screen 3 because of different screen positions.

To obviate this problem, the CRTs 12, 13 for displaying red (R) and blue (B) images respectively have an auxiliary yoke 8 mounted thereon, as shown in FIG. 1. The auxiliary yoke 8 generates a magnetic field for securing the same shape as the raster projected from the central CRT 11 onto the screen 3 in order to correct the magnifications of the images as described above. FIG. 3 is a block diagram showing a circuit for correcting the raster shape by supplying current to the auxiliary yoke 8. An input terminal 200 for supplying a raster shape correction voltage is connected to an input terminal of an amplifier 7, the other input terminal of which is grounded through a resistor 92. The output terminal of the amplifier 7 is grounded through a series circuit including the auxiliary yoke 8 and a resistor 9, and the connecting point between the auxiliary yoke 8 and the resistor 9 is connected to the other input terminal of the amplifier 7 through a resistor 91.

Now, the operation of this raster shape correction circuit will be explained. The input terminal 200 is impressed with a sawtoothed-shaped voltage in horizontal period, as shown in FIG. 4, for correcting the width in horizontal direction (hereinafter referred to as the horizontal width), a parabolic waveform voltage in horizontal period, as shown in FIG. 5, for correcting the horizontal linearity, a sawtoothed-shaped voltage in vertical period, as shown in FIG. 6 for correcting the inclination of the vertical lines, a parabolic voltage in vertical period, as shown in FIG. 7, for correcting the arcuate distortion of vertical lines, a keystone correction voltage, as shown in FIG. 8, for correcting the trapezoidal distortion of the raster, and a raster shape correction voltage combined with a regulation voltage, etc. including a DC voltage for adjusting the static convergence. Thus, the raster shape correction voltage is amplified by the amplifier 7, and a current flows in the auxiliary yoke 8. The shape of the raster displayed on the picture planes of the CRTs 12, 13 is corrected in such a manner that the trapezoidal red (R) raster 52 shown in FIG. 2 becomes the same shape as the green (G) raster 51 on the screen 3. Although the description concerns the correction along the horizontal direction alone, a similar correction is possible using a similar circuit along the vertical direction, whereby the same shape is secured for the rasters 51 and 52.

In the above-mentioned system, when the static convergence on the screen is displaced by the effect of earth magnetism or the like, the static convergence regulation voltage containing a DC voltage described above is changed to adjust the static convergence at the central position of each raster of green (G), red (R) and blue (B). Nevertheless, the problem remains that even when the static convergence is adjusted at the central position of the screen, a convergence displacement occurs at the peripheral portions due to the presence of the convergence angle described above.

SUMMARY OF THE INVENTION

The invention has been developed in order to obviate the above-mentioned problems, and the object thereof is to provide a projection-type image display apparatus free from convergence displacement at the peripheral portions of the screen at the time of static convergence adjustment.

According to one aspect of the invention, there is provided a projection-type image display apparatus comprising a common screen and a plurality of cathode-ray tubes in juxtaposition, each including a sawtoothed-shaped voltage correction circuit to be supplied with a sawtoothed-shaped voltage and a regulation voltage for adjusting the static convergence and a raster shape correction circuit supplied with a sawtoothed-shaped voltage outputted from the sawtoothed-shaped voltage correction circuit, the sawtoothed-shaped voltage being the one in horizontal period.

According to another aspect of the invention, there is provided a projection-type image display apparatus, wherein the sawtoothed-shaped voltage correction circuit includes a multiplier supplied with the regulation voltage and the sawtoothed-shaped voltage as two inputs thereto.

According to still another aspect of the invention, there is provided a projection-type image display apparatus, wherein the sawtoothed-shaped voltage correction circuit includes an amplifier supplied with the sawtoothed-shaped voltage as an input thereto and an electron variable resistor interposed between the other input and the output of the amplifier for determining a resistance value in accordance with the regulation voltage.

When different monochromatic images are displayed on the respective the picture planes of the juxtaposed cathode-ray tubes, corresponding images are projected on the screen, so that an image synthesized from different monochromatic images is displayed on the screen. The regulation voltage for adjusting the static convergence and the sawtoothed-shaped voltage for correcting the raster shape in accordance with the projection angle to the screen of the cathode-ray tubes are supplied to the sawtoothed-shaped voltage correction circuit, thereby outputting a correction sawtoothed-shaped voltage which changes in voltage level responsive to the regulation voltage. The raster movement due to the change in regulation voltage causes the displacement of the dynamic convergence. By supplying the correction sawtoothed-shaped voltage to the raster shape correction circuit, however, the raster shape is corrected into a shape offsetting the displacement of the dynamic convergence. When the sawtoothed-shaped voltage in horizontal period is supplied to the sawtoothed-shaped voltage correction circuit, on the other hand, the displacement of the dynamic convergence due to the horizontal movement of the raster responsive to the change in regulation voltage is prevented.

According to a further aspect of the invention, there is provided a projection-type image display apparatus comprising a sawtoothed-shaped voltage correction circuit for supplying a sawtoothed-shaped voltage in horizontal period and a raster shape correct, ion circuit, wherein the sawtoothed-shaped voltage correction circuit is supplied with a parabolic voltage regulating the horizontal linearity of the raster and outputs a correction parabolic voltage changing in voltage level in accordance with the regulation voltage supplied thereto, and the raster shape correction circuit corrects the raster shape displayed on the screen in accordance with the correction parabolic voltage supplied thereto. As a consequence, the horizontal linearity of the raster is not displaced at the time of adjustment of the static convergence.

According to a still further aspect of the invention, there is provided a projection-type image display apparatus comprising a common screen and three cathode-ray tubes in juxtaposition each having a sawtoothed-shaped voltage correction circuit and a raster shape correction circuit supplied with the correction sawtoothed-shaped voltage outputted from the sawtoothed-shaped voltage correction circuit.

As a result, the shape of the raster displayed on the picture planes of the cathode-ray tubes on the sides of the central cathode-ray tube is corrected into such a shape as to offset the displacement of dynamic convergence in accordance with the correction sawtoothed-shaped voltage.

The above and further objects and features of the invention will more fully be apparent from the following detailed description with accompanying drawings.

DESCRIPTION OF THE PREFERRED EMBODIMENTS

The invention will be described in detail below with reference to the drawings showing embodiments thereof.

EMBODIMENT 1

Figure 1:
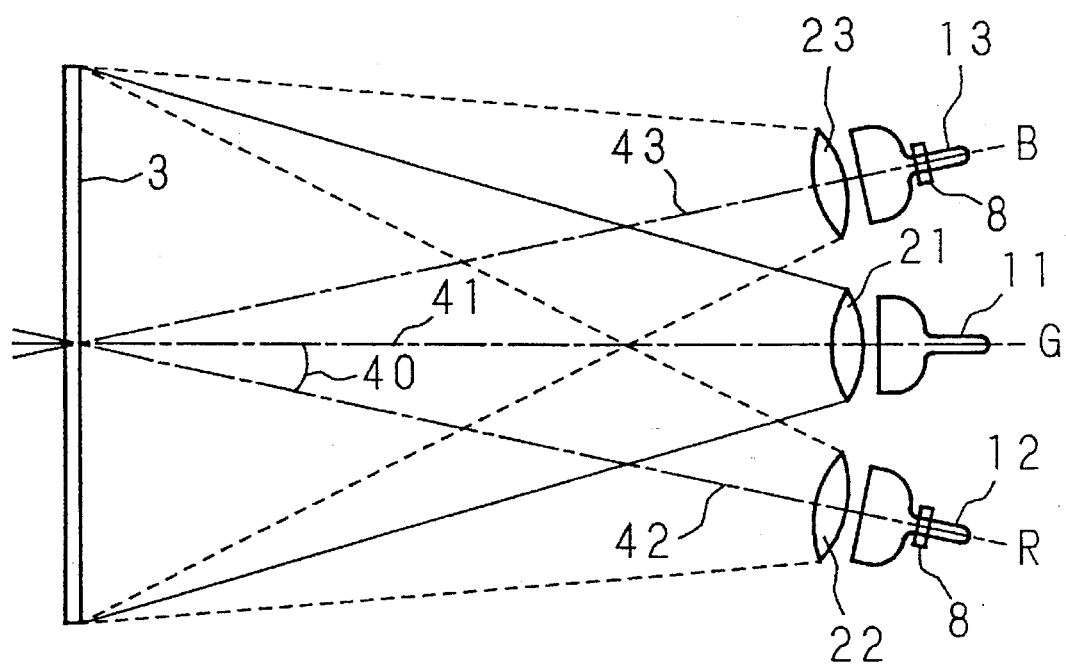
FIG. 1 is a schematic plan view showing an optical system of a conventional projection-type image display apparatus.
Figure 2:
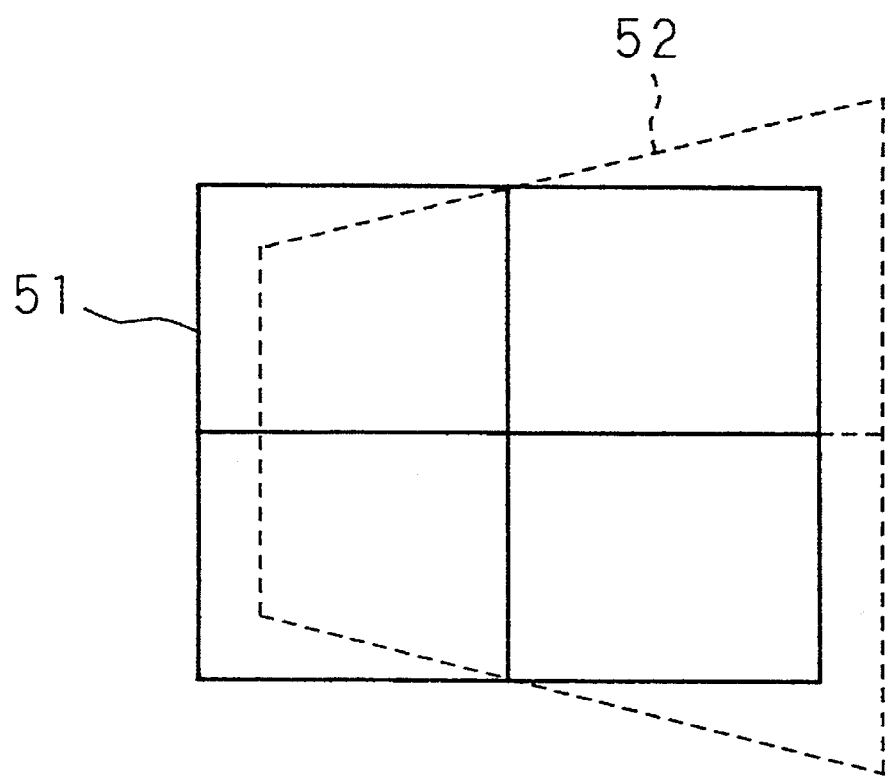
FIG. 2 is a state diagram showing the shape of red raster projected on the screen.
Figure 3:
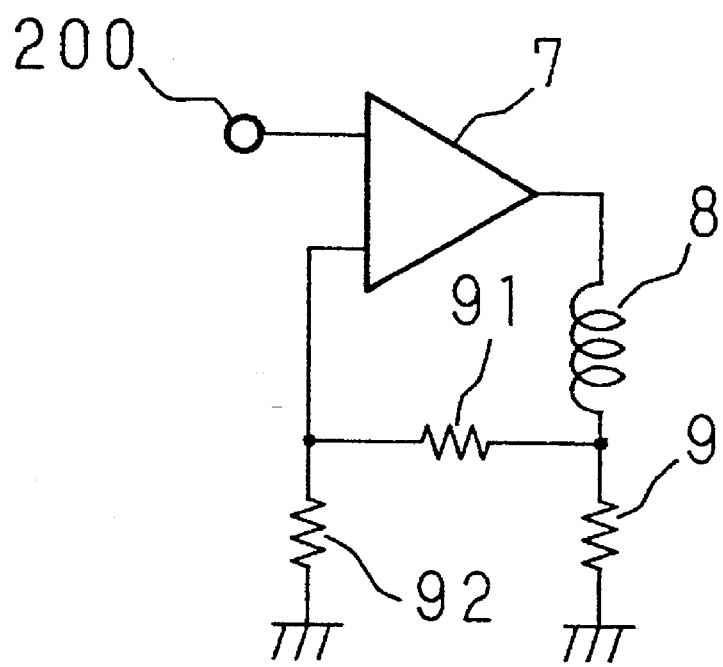
FIG. 3 is a circuit diagram of a raster shape correction circuit for correcting the shape of the raster projected on the screen.
Figure 4:
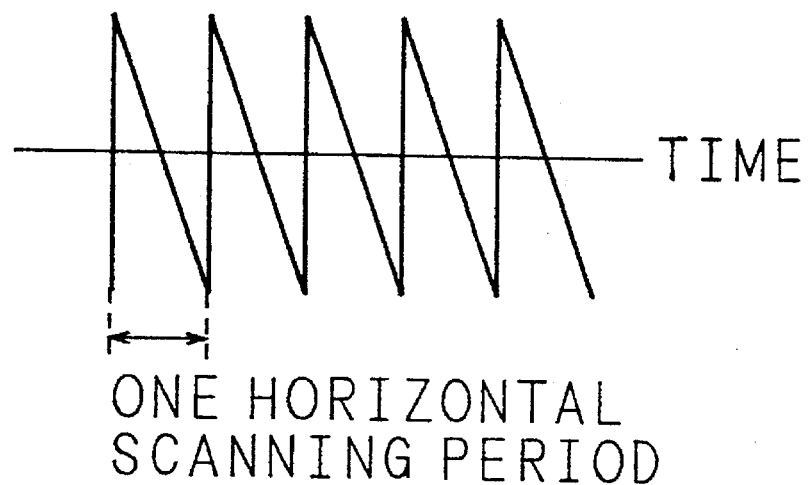
FIG. 4 shows a sawtoothed-shaped voltage waveform in horizontal period supplied to the conventional raster shape correction circuit.
Figure 5:
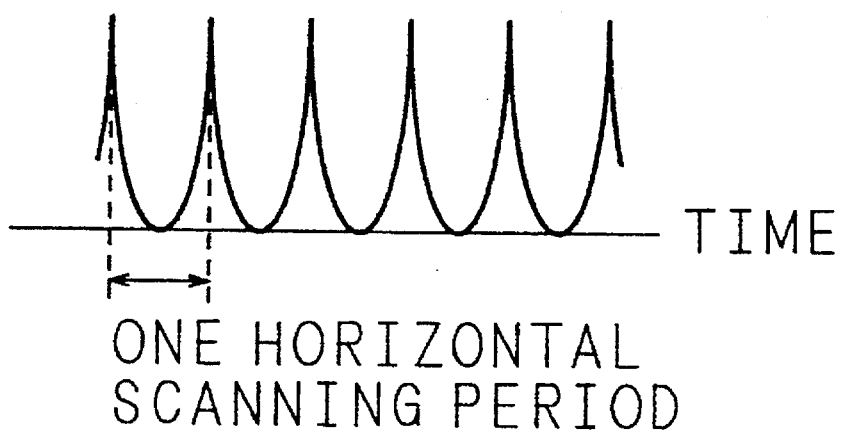
FIG. 5 shows a parabolic voltage waveform in horizontal period supplied to the conventional raster shape correction circuit.
Figure 6:
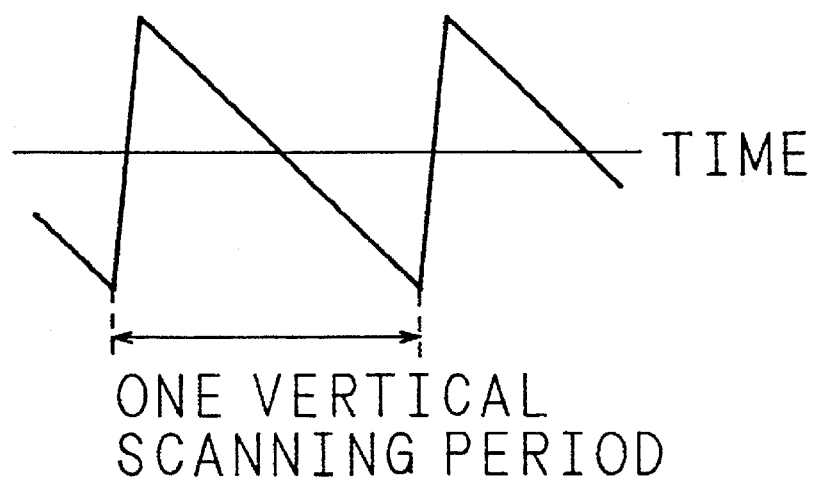
FIG. 6 shows a waveform of a sawtoothed-shaped voltage in vertical period supplied to the conventional raster shape correction circuit.
Figure 7:
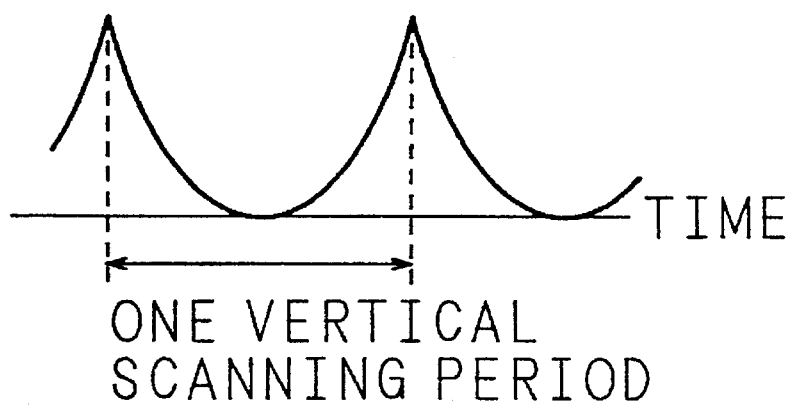
FIG. 7 shows a waveform of a parabolic voltage waveform in vertical period supplied to the conventional raster shape correction circuit.
Figure 8:
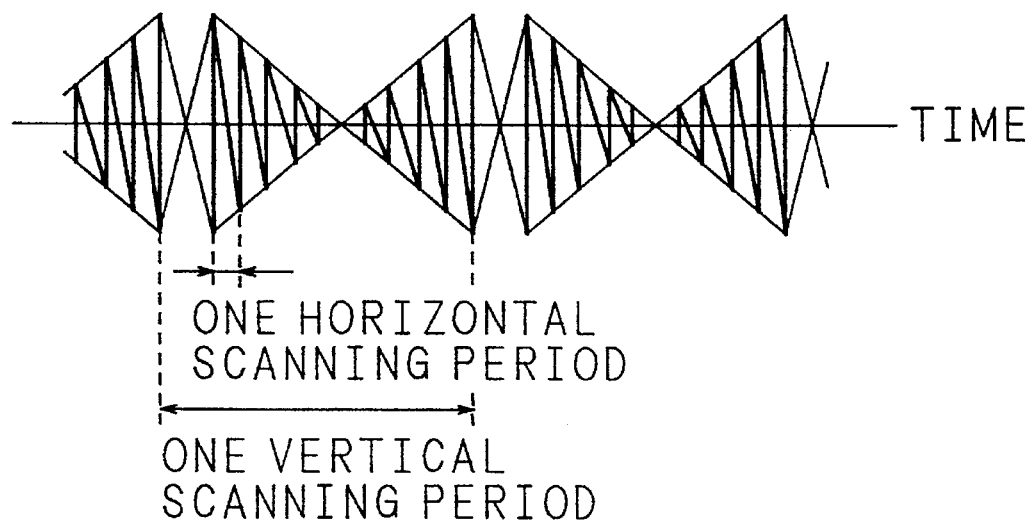
FIG. 8 shows a waveform of a keystone correction voltage waveform supplied to the conventional raster shape correction circuit.
Figure 9:
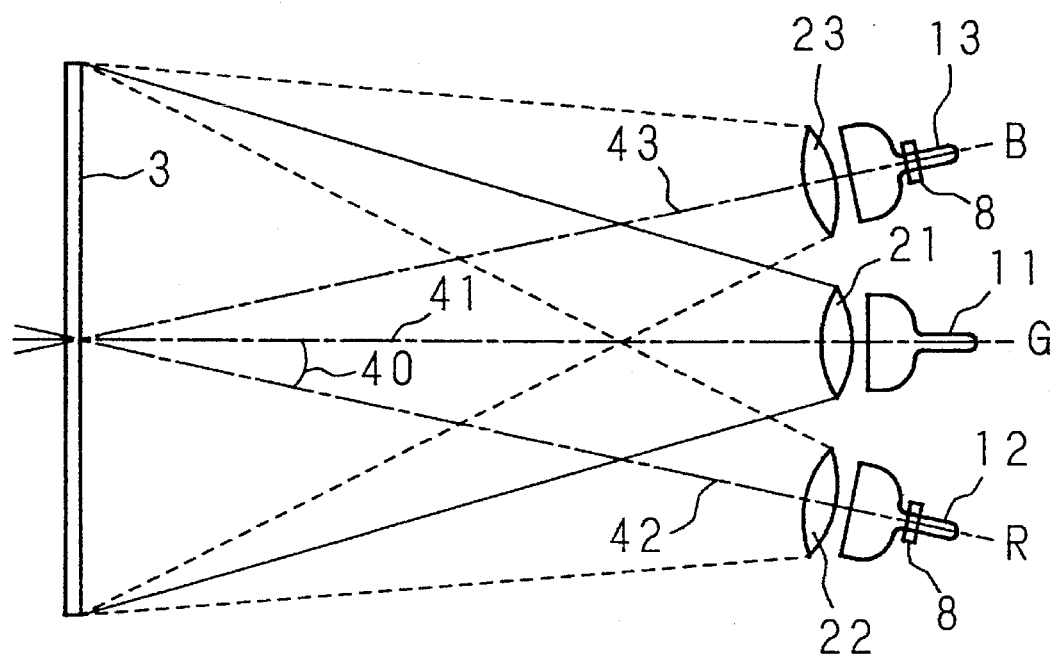
FIG. 9 is a schematic plan view showing the optical system of a projection-type image display apparatus according to the invention.

A schematic plan view of the optical system of a projection-type image display apparatus according to the invention is shown in FIG. 9. In front of the screen 3, CRTs 11, 12, 13 are juxtaposed. With the CRT 11 at the center, the CRT 12 is disposed on one side and the CRT 13 on the other side thereof. The picture planes (not shown) of the CRTs 11, 12, 13 are arranged in opposed relationship to the screen 3. The CRT 11 is adapted to illuminate monochromatically in green (G), the CRT 12 in red (R) and the CRT 13 in blue (B). A monochromatic image is displayed on each of the picture planes of the CRTs 11, 12, 13.

Projection lenses 21, 22, 23 are arranged in front of the CRTs 11, 12, 13 respectively. The optical axes of the projection lenses 22, 23 have a convergence angle 40 to the optical axis 41 of the projection lens 21 and are oriented inward of the screen 3.

When images of green (G), red (R) and blue (B) are displayed separately on each picture plane of the CRTs 11, 12, 13 of the projection-type image display apparatus having this configuration, each image is projected in enlarged form on the screen 3 through the projection lenses 21, 22, 23. Then a full-color image synthesized from the images of green (G), red (R) and blue (B) is displayed on the screen 3 and is presented as an image available for observation.

Figure 10:
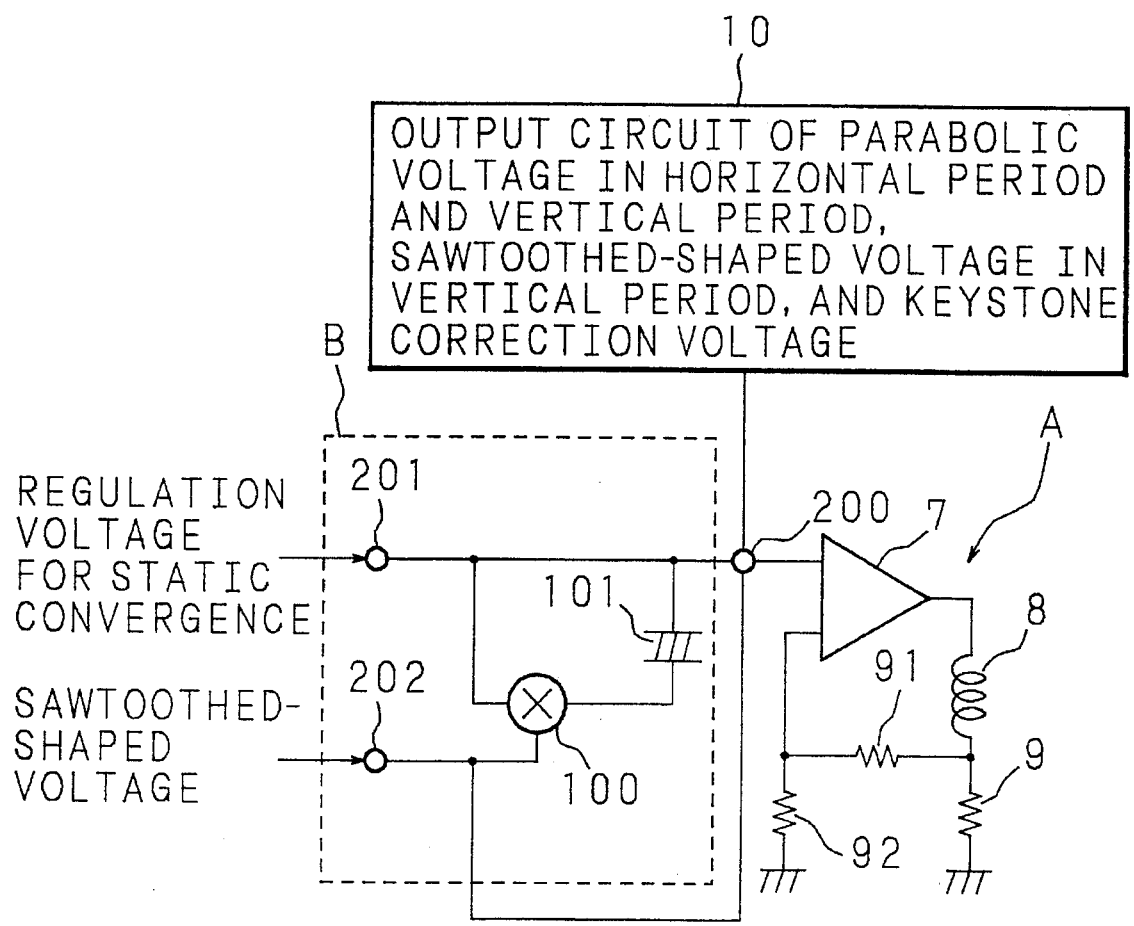
FIG. 10 is a block diagram showing the configuration of essential parts of a projection-type image display apparatus according to the invention.

A block diagram of FIG. 10 shows the configuration of the essential parts of a projection-type image display apparatus described above. Each of the CRTs 12, 13 shown in FIG. 9 includes the essential parts of the projection-type image display apparatus described above, respectively. A regulation voltage input terminal 201 is the one supplied with a regulation voltage being a DC voltage for adjusting the static convergence. This regulation voltage input terminal 201 is connected to one input terminal of a multiplier 100 and the input terminal 200 connected with an output circuit 10. This output circuit 10 is the one for outputting a parabolic voltage in horizontal period, a sawtoothed-shaped voltage in vertical period, a parabolic voltage in vertical period and a keystone correction voltage. The sawtoothed-shaped voltage input terminal 202 is the one supplied with a sawtoothed-shaped voltage in horizontal period (horizontal scanning period) and is connected to the other input terminal of the multiplier 100 and the input terminal 200.

The output, terminal of the multiplier 100 is connected to the input terminal 200 through a capacitor 101. The input terminal 200 is connected to one input terminal of an amplifier 7, the output terminal of which is grounded through a series circuit including a resistor 9 and an auxiliary yoke 8 for generating a magnetic field for correcting the raster shape on the screen so as to permit rectangular raster projection on the screen. The connecting point between the auxiliary yoke 8 and the resistor 9 is connected to the other input terminal of the amplifier 7 through the resistor 91, and the other input terminal is grounded through a resistor 92.

The input terminal 200 is adapted to be supplied with a raster shape correction voltage composed of a combination of a parabolic voltage in vertical period, a sawtoothed-shaped voltage in vertical period, a keystone correction voltage, a static convergence regulation voltage, a parabolic voltage in horizontal period and a sawtoothed-shaped voltage in horizontal period.

The amplifier 7, the auxiliary yoke 8 and the resistances 9, 91, 92 make up a raster shape correction circuit A. The multiplier 100 and the capacitor 101, on the other hand, construct a sawtoothed-shaped voltage correction circuit B.

Figure 11:
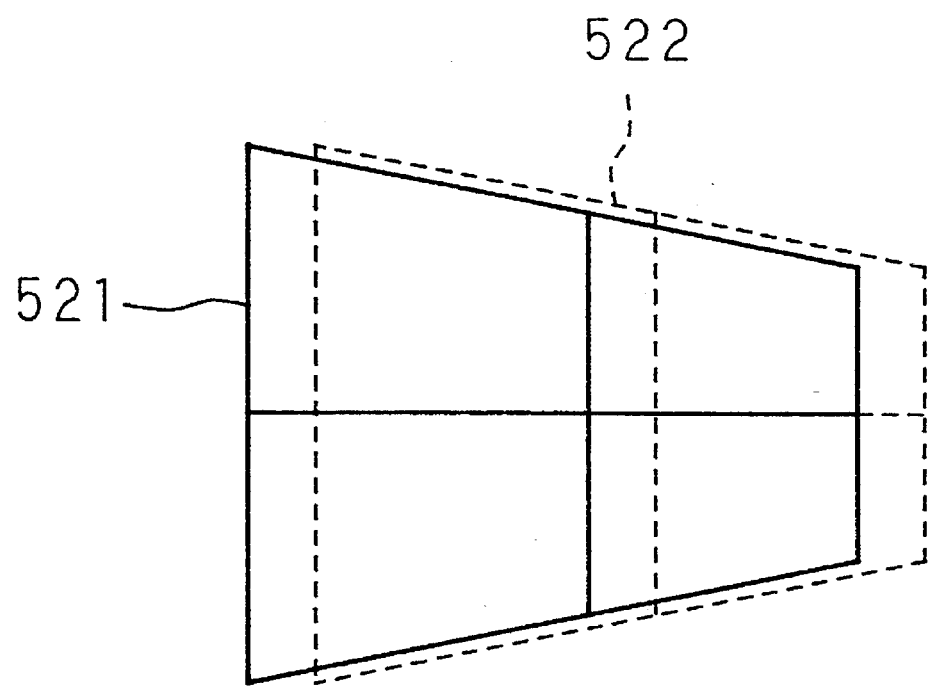
FIG. 11 is a state diagram showing the state in which the raster moves on the screen.

The operation of the projection-type image display apparatus configured as described above will be explained. Upon application to the input terminal 200 of a raster shape correction voltage including a combination of a sawtoothed-shaped voltage in horizontal period, a parabolic voltage in horizontal period, a sawtoothed-shaped voltage in vertical period, a parabolic voltage in vertical period, a keystone correction voltage and a regulation voltage for adjusting the static convergence, then the raster shape correction voltage is amplified at the amplifier 7 so that a current corresponding to the raster shape correction voltage flows in the auxiliary yoke 8. As a result, a trapezoidal raster 521, for example, is displayed as shown in FIG. 11 on the picture plane of the CRT 12 (refer to FIG. 9) having the auxiliary yoke 8 mounted thereon. This trapezoidal raster 521 is of such a shape that has been corrected to a rectangle even when projected on a screen having a different projection magnification depending on the position therein and that is viewed from a user.

In other words, as for the CRT 12, the magnification of the image projected on the screen 3 is larger on the left side of the screen than on the right side. Since the screen is laterally reversed by the projection lens 22, the projection magnification of the right image is larger than that of the left image on the screen of the CRT 12. The deformation of the raster shape due to the difference in projection magnification is corrected by increasing the vertical width on the left side of the raster displayed on the screen as compared with that on the right side thereof. When a raster 521 of this shape is projected on the screen 3 from the CRT 12, a rectangular raster having the same vertical widths on right and left sides is displayed on the screen 3. The shape of this raster is identical to that of the raster projected from the central CRT 11.

A raster of a shape reversed laterally from the raster shown in FIG. 11 is displayed on the picture plane of the CRT 13. In the same way as the CRT 11, a raster is displayed on screen 3, and an image synthesized from the images projected from the CRTs 11, 12, 13 is displayed on the screen 3.

In the case where the static convergence is required to be adjusted, the regulation voltage is supplied to the terminal 201. According to the embodiment, explanation will made about the case where the regulation voltage for static convergence is smaller than a reference voltage. In such a case, as shown by dashed line in FIG. 11, the raster 521 is moved, for example, rightward along the horizontal direction on the picture plane of the CRT 12 in accordance with the regulation voltage for static convergence (raster 522).

Figure 12:
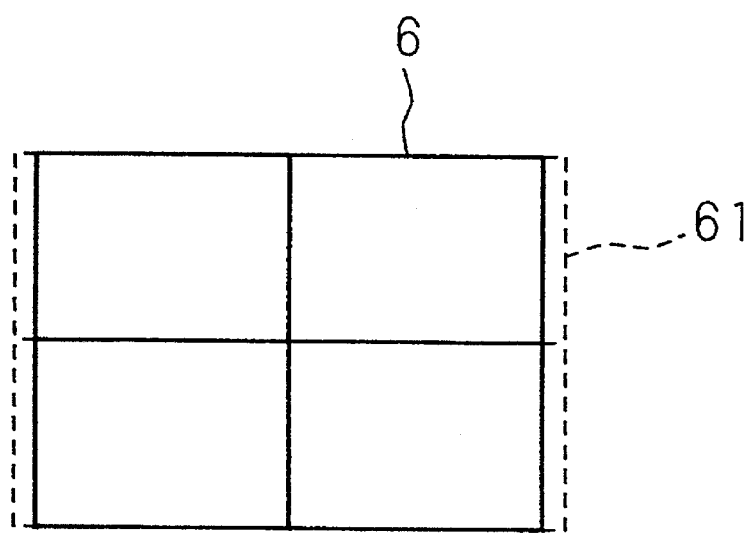
FIG. 12 is a state diagram showing the state in which the horizontal width of the raster changes on the screen.

As a result of the rightward movement, on the screen 3 (refer to FIG. 9), as shown in FIG. 12, the horizontal width of the red (R) raster 61 projected from the CRT 12 is increased as compared with that of the green (G) raster 6 on the picture plane of the CRT 12. This is due to the fact that as described above, the projection magnification is larger, the more rightward of the picture plane of the CRT 12 shown in FIG. 11. Assuming that the screen 3 is 50 inches in size, the magnification of the projection lens is ×10 and the convergence angle is 9 degrees, for example, the horizontal width of the raster increases by about 3 mm on the screen 3. Although the raster is moved rightward in FIG. 11, the raster 521 is moved leftward in the case where the regulation voltage four the static convergence is larger than the reference voltage, in this case, the projection magnification is larger the more leftward of the screen, so that the red (R) raster 61 is smaller in horizontal width than the green (G) raster 6.

Assuming that the static convergence regulation voltage is smaller than the reference voltage, the raster is moved rightward or, when the regulation voltage is larger, moved leftward to remove the displacement of the static convergence. In the case where the sawtoothed-shaped voltage input terminal 202 is supplied with a sawtoothed-shaped voltage in horizontal period and the raster is moved rightward in accordance with the static convergence regulation voltage supplied to the regulation voltage input terminal 201, the sawtoothed-shaped voltage shown in FIG. 13 is outputted from the multiplier 100, while the sawtoothed-shaped voltage shown in FIG. 14 is outputted when the raster is moved leftward.

Figure 15:
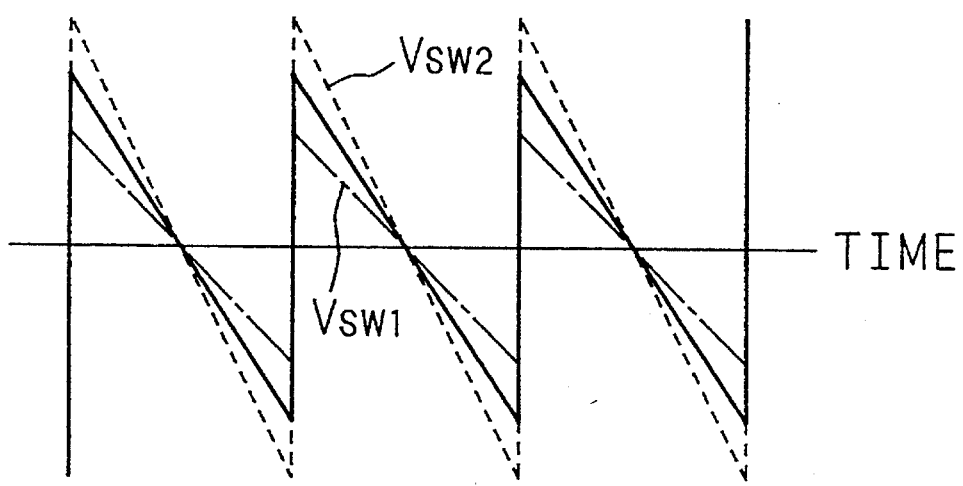
FIG. 15 shows a sawtoothed-shaped voltage waveform obtained in accordance with the static convergence regulation voltage.

The sawtoothed-shaped voltage before being inputted to the multiplier 100 is added too the sawtoothed-shaped voltage outputted from the multiplier 100 and is supplied to the input terminal 200. In this way, in the case where the raster is moved rightward, the sawtoothed-shaped voltage corrected in accordance with the static convergence regulation voltage assumes a sawtoothed-shaped voltage $V_{sw1}$ low in voltage level as shown by one-dot chain in FIG. 15, while in the case where the raster is relocated leftward, a sawtoothed-shaped voltage $V_{sw2}$ high in voltage level as shown by dashed line is involved. The sawtoothed-shaped voltage thus corrected is supplied to the amplifier 7 together with a voltage of another waveform in order to obtain a raster shape correction voltage, and a current corresponding to the voltage flows in the auxiliary yoke 8. As a result, the shape of the raster 521 displayed on the picture plane of the CRT 12 is corrected in anticipation of the degree of change in the horizontal width of the raster projected on the screen by the horizontal movement at the time of static convergence adjustment.

Figure 13:
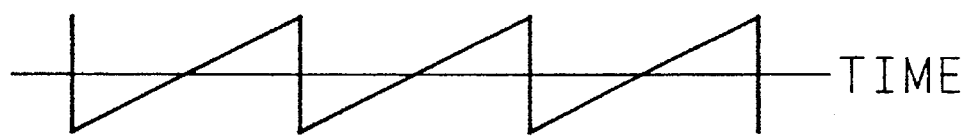
FIG. 13 shows a sawtoothed-shaped voltage waveform obtained in accordance with the static convergence regulation voltage.
Figure 14:
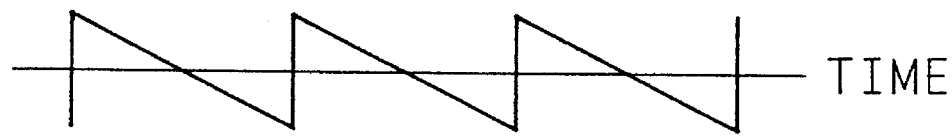
FIG. 14 shows a sawtoothed-shaped voltage waveform obtained in accordance with the static convergence regulation voltage.

In the case where the raster shape on the picture plane is corrected in the same manner as described above in accordance with the static convergence regulation voltage for the CRT 13, the projection magnification which is smaller the more rightward of the screen causes the sawtoothed-shaped voltage shown in FIG. 13 to be outputted from the multiplier 100 when the raster is moved leftward, while the sawtoothed-shaped voltage shown in FIG. 14 is outputted with the rightward movement of the raster, thereby correcting the sawtoothed-shaped voltage.

The dynamic convergence is regulated at the same time of regulating of the static convergence is adjusted by correcting the raster on the picture planes of the CRTs 12, 13 in this way. As a consequence, the displacement of the convergence at the peripheral portions of the screen can be prevented at the time of static convergence regulation.

The capacitor 101 interposed between the output terminal of the multiplier 100 and the input terminal 200 according to the embodiment can be eliminated depending on the circuit configuration.

EMBODIMENT 2

According to the aforementioned embodiment, the variation in the horizontal width of the raster due to the horizontal movement at the time of static convergence adjustment was corrected. During the static convergence adjustment, however, the linearity in the horizontal scanning direction (hereinafter referred to as "the horizontal linearity") changes at the same time. Explanation will be made about an embodiment in which the horizontal width of the raster and the horizontal linearity can be prevented from changing.

Figure 16:
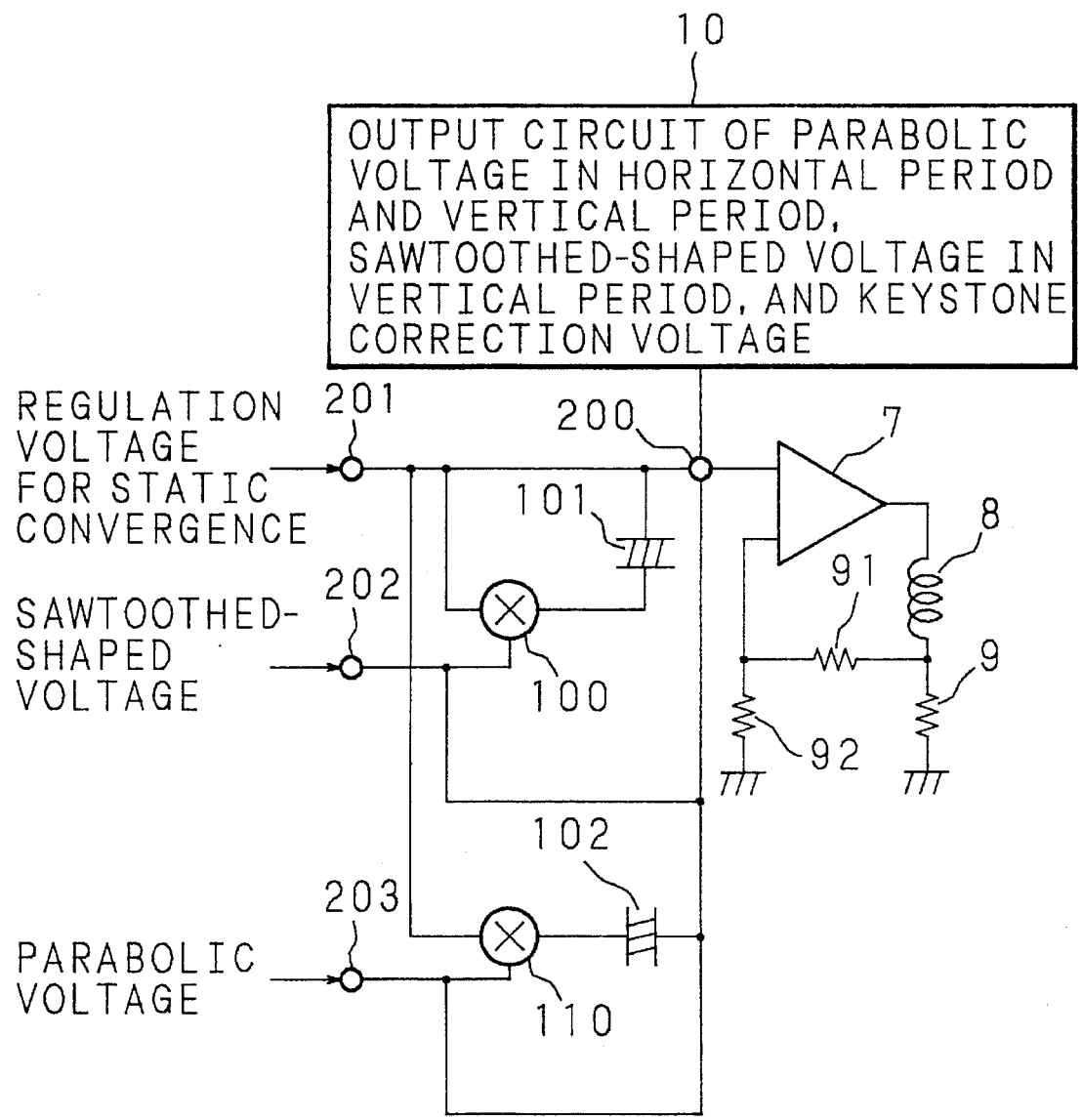
FIG. 16 is a block diagram showing the configuration of the essential parts of a projection-type image display apparatus according to another embodiment of the invention.

The essential parts of a projection-type image display apparatus according to another embodiment of the invention are shown in the block diagram of FIG. 16. A regulation voltage input terminal 201 for supplying a regulation voltage for the static convergence is connected to an input terminal 200 supplied with a raster shape correction voltage, an input terminal of the multiplier 100, and an input terminal of a multiplier 110. A sawtoothed-shaped voltage input terminal 202 supplied with a sawtoothed-shaped voltage in horizontal period is connected to the other input terminal of the multiplier 100 and the input terminal 200. The input terminal 203 supplied with a parabolic voltage in horizontal period is connected to the other input terminal of the multiplier 110 and the input terminal 200. The output terminal of the multiplier 100 is connected to the input terminal 200 through a capacitor 101, and the output terminal of the multiplier 110 is connected to the input terminal 200 through a capacitor 102. The remaining component parts are not explained as they are similar to those shown in FIG. 10, and are designated by the same reference numerals as the corresponding parts in FIG. 10.

In a projection-type image display apparatus configured as described above, the multiplier 100 outputs a sawtoothed-shaped voltage in horizontal period for offsetting the change in horizontal width of the raster in accordance with the static convergence regulation voltage, and the multiplier 110 a parabolic voltage in horizontal period for offsetting the change in linearity in accordance with the static convergence regulation voltage. A current corresponding to these sawtoothed-shaped voltage and the parabolic voltage flows in the auxiliary yoke 8. In the projection-type image display apparatus shown in FIG. 10, the change in horizontal width of the raster on the screen was suppressed. In view of the fact that, strictly speaking, the horizontal linearity also changes at the time of static convergence regulation, the configuration of FIG. 16 suppresses the change in horizontal linearity and therefore makes it possible to adjust the dynamic convergence with higher accuracy.

Although the embodiment comprises the capacitor 101 between the output terminal of the multiplier 100 and the input terminal 200 and the capacitor 102 between the output terminal of the multiplier 110 and the input terminal 200, the capacitors may be deleted depending on the circuit configuration.

EMBODIMENT 3

Figure 17:
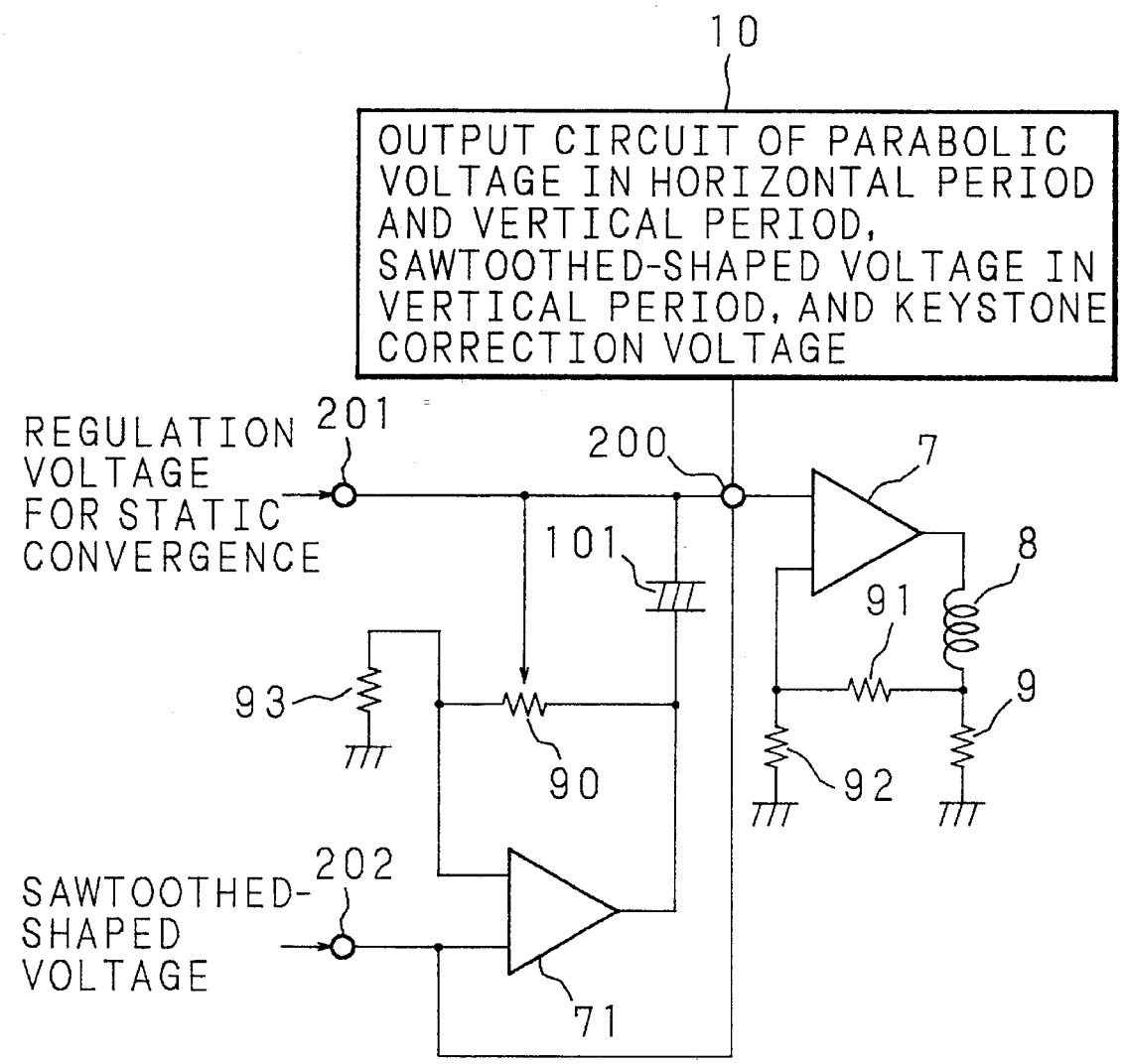
FIG. 17 is a block diagram showing the configuration of the essential parts of a projection-type image display apparatus according to still another embodiment of the invention.

A block diagram of the essential parts of a projection-type image display apparatus according to still another embodiment is shown in FIG. 17. A regulation voltage input terminal 201 supplied with a static convergence regulation voltage is connected to an input terminal 200 supplied with a raster shape correction voltage and a resistance value selection terminal of an electronic variable resistor 90 configured like a ladder resistance. One input terminal of an amplifier 71 is grounded through a resistance 93. The electronic variable resistor 90 is interposed between one input terminal and the output terminal of the amplifier 71. The output terminal of the amplifier 71 is connected to the input terminal 200 through the capacitor 101. A sawtoothed-shaped voltage input terminal 202 supplied with a sawtoothed-shaped voltage in horizontal period is connected to the other input terminal of the amplifier 71 and the input terminal 200. The other component parts of the embodiment in FIG. 17 are not explained any more as they are similar to those of FIG. 10, and are respectively designated by the same reference numerals as the corresponding parts in FIG. 10.

In the case where the amplifier 71 and the variable resistor 90 are used as in the above-mentioned configuration, the resistance value of the variable resistor 90 is selected in accordance with the static convergence regulation voltage, so that a sawtoothed-shaped voltage after correction of the voltage level of the sawtoothed-shaped voltage in horizontal period is obtained in a manner similar to the case in which the multiplier 100 is used. The sawtoothed-shaped voltage after correction is used to suppress the change in horizontal width of the raster on the picture plane thereby to adjust the static convergence and dynamic convergence.

It will thus be understood from the foregoing description that according to the invention, the level of the sawtoothed-shaped voltage in horizontal period is changed in accordance with the static convergence regulation voltage, so that the raster shape displayed on the picture planes of a plurality of cathode-ray tubes are corrected by the sawtoothed-shaped voltage changed in level, and therefore the convergence displacement is prevented from occurring at the peripheral portion of the screen as the dynamic convergence is adjusted at the time of static convergence adjustment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection-type image display apparatus comprising:
   a screen;
   a plurality of cathode-ray tubes in juxtaposition each including a picture plane for forming an image of a different monochromatic color, said image being projected on said screen;
   a sawtoothed-shaped voltage correction circuit supplied with a regulation voltage for adjusting a static convergence of said image on said screen and a sawtoothed-shaped voltage for correcting a raster shape displayed on the picture plane of one cathode-ray tube in accordance with a projection angle to said screen of said cathode-ray tubes, and outputting a correction sawtoothed-shaped voltage changing in voltage level in accordance with said regulation voltage inputted thereto; and
   a raster shape correction circuit supplied with said correction sawtoothed-shaped voltage for correcting the raster shape displayed on said picture plane in accordance with said sawtoothed-shaped voltage in such a manner that the raster shape of said one cathode-ray tube projected on said screen is identical to raster shapes of the other cathode-ray tubes.

2. A projection-type image display apparatus comprising:
   a screen;
   three cathode-ray tubes each including a picture plane for forming an image thereon, said cathode-ray tubes being juxtaposed in such a manner that a different three-color monochromatic image is formed on each picture plane and projected on said screen;
   a plurality of sawtoothed-shaped voltage correction circuits each supplied with a regulation voltage for adjusting a static convergence against said screen of said image and a sawtoothed-shaped voltage for correcting a raster shape displayed on each picture plane of the cathode-ray tubes on sides in accordance with a projection angle of said cathode-ray tubes to said screen, and outputting a correction sawtoothed-shaped voltage changing in voltage level in accordance with said regulation voltage; and
   a plurality of raster shape correction circuits each supplied with said correction sawtoothed-shaped voltage correspondingly for correcting the raster shape displayed on each picture plane in accordance with said sawtoothed-shaped voltage in such a manner that the raster shape of the cathode-ray tubes projected on said screen on the sides is identical to the raster shape of a central cathode-ray tube.

3. A projection-type image display apparatus according to claim 1, wherein said sawtoothed-shaped voltage is in a horizontal period.

4. A projection-type image display apparatus according to claim 1, wherein said sawtoothed-shaped voltage correction circuit includes a multiplier supplied with said regulation voltage and said sawtoothed-shaped voltage as two inputs thereto.

5. A projection-type image display apparatus according to claim 1, wherein said sawtoothed-shaped voltage correction circuit includes an amplifier supplied with said sawtoothed-shaped voltage as one input thereto and a variable resistor inserted between the other input and the output of said amplifier for determining a resistance value of said variable resistor in accordance with said regulation voltage.

6. A projection-type image display apparatus according to claim 3, wherein said sawtoothed-shaped voltage correction circuit is supplied with a parabolic voltage for regulating a horizontal linearity of a raster displayed on the picture plane of one cathode-ray tube, and outputting a correction parabolic voltage changing in voltage level in accordance with said regulation voltage, and said raster shape correction circuit is supplied with the correction parabolic voltage outputted from said sawtoothed-shaped voltage correction circuit for correcting the shape of the raster displayed on said picture plane in accordance with said parabolic voltage in such a manner that the horizontal linearity of the raster of said one cathode-ray tube projected on the screen is identical to the horizontal linearity of the raster of the other cathode-ray tubes.

7. A method for correcting a convergence displacement in a projection-type image display apparatus including a plurality of cathode-ray tubes in juxtaposition for projecting an image on a screen, each cathode-ray tube having a picture plane for forming the image of a different monochromatic color, comprising the steps of:

(a) applying a regular voltage to a voltage correction circuit for adjusting a static convergence of said image on said screen;

(b) applying a sawtoothed-shaped voltage to said voltage correction circuit for correcting a raster shape displayed on the picture plane of at least one of the cathode-ray tubes in accordance with a projection angle to said screen of the cathode-ray tubes in accordance with said regular voltage;

(c) generating a correction sawtoothed-shaped voltage from said voltage correction circuit changing in voltage level in accordance with said regulation voltage inputted thereto; and (d) applying said correction sawtoothed-shaped voltage to a raster shape correction circuit for correcting said raster shape displayed on said picture plane of said at least one of the cathode-ray tubes in accordance with said sawtoothed-shaped voltage such that the raster shape of said at least one of the cathode-ray tubes projected on said screen matches raster shapes of the other cathode ray tubes.

8. The method of claim 7, further comprising the steps of:

(e) applying a parabolic voltage to said voltage correction circuit for regulating a horizontal linearity of a raster displayed on the picture plane of said at least one of the cathode-ray tubes, (f) generating a correction parabolic voltage changing in voltage level in accordance with said regulation voltage;

(g) applying said correction parabolic voltage to said raster shape correction circuit for correcting the shape of the raster displayed on said picture plane of said at least one of the cathode-ray tubes in accordance with said parabolic voltage such that the horizontal linearity of the raster of said at least one of the cathode-ray tubes projected on said screen matches the horizontal linearity of the raster of the other cathode-ray tubes.

* * * * *